Feb. 25, 1964  L. C. ROOTS  3,122,422
EXTRACTOR BASKET, APPARATUS AND METHOD
Filed Jan. 12, 1961  2 Sheets-Sheet 1
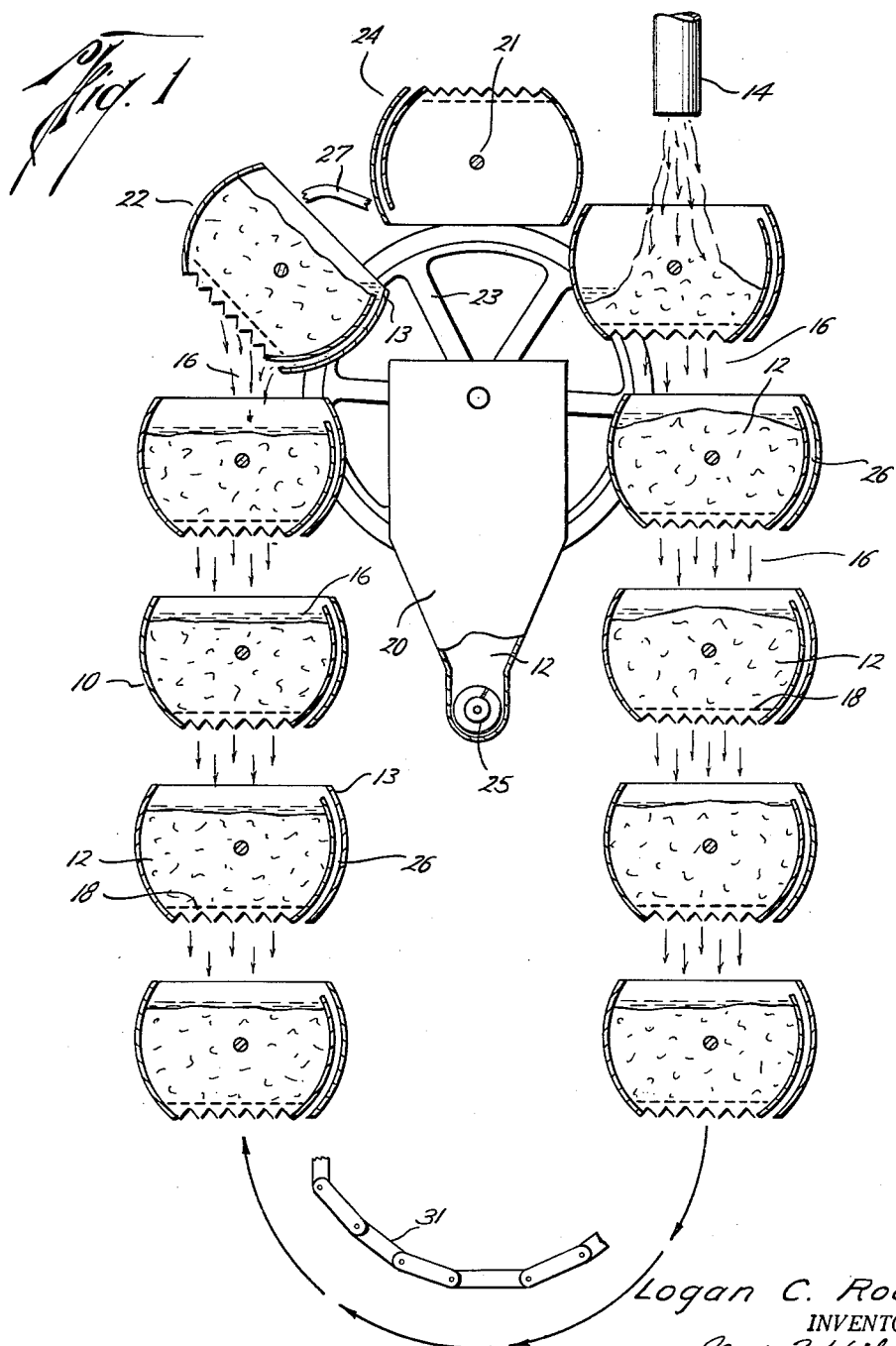
Logan C. Roots
INVENTOR.
BY James F. Weiler
Jefferson D. Giller
William A. Stout
Paul L. DeVerter II
ATTORNEYS

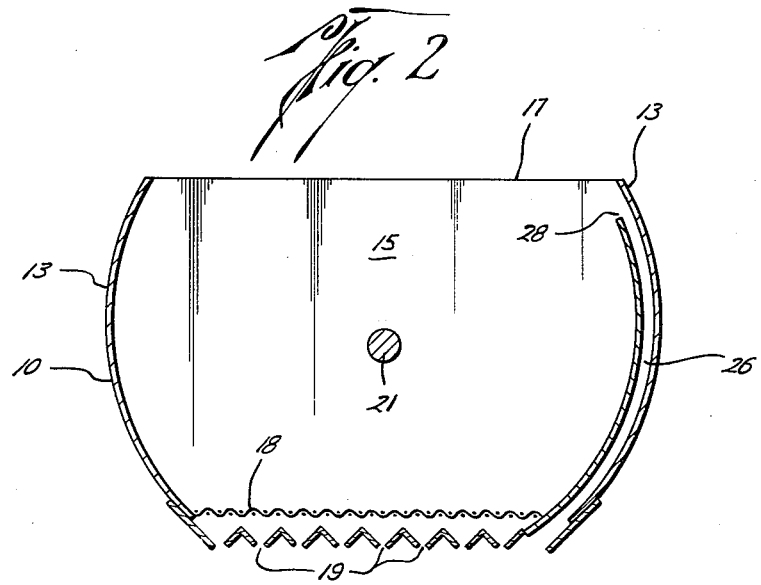
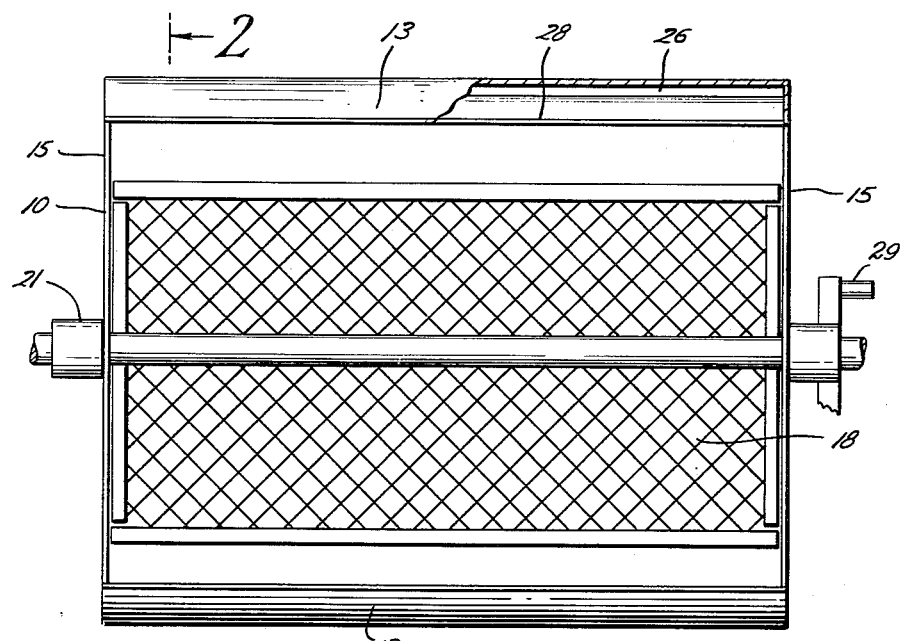

United States Patent Office 3,122,422
Patented Feb. 25, 1964

3,122,422
EXTRACTOR BASKET, APPARATUS AND METHOD
Logan Chester Roots, Brownsville, Tex., assignor to Anderson, Clayton & Co., Inc., Houston, Tex., a corporation of Delaware
Filed Jan. 12, 1961, Ser. No. 82,203
3 Claims. (Cl. 23—311)

The present invention relates to an improved extractor basket, apparatus and method in which a solvent is percolated downwardly through a material from which a substance is to be extracted.

The present invention is directed to an improved extractor basket, apparatus and method suitable for use in any of the referred to devices wherein the basket is discharged by tipping the basket so that the contained material is dumped into a hopper. The present invention is particularly useful in the solvent extraction of oil or fat from solids; however, the present invention is not limited to use in extractors wherein only oil or fat is extracted from solids, but it may also be used in other extraction operations, such as the extraction of waxes from solids, rosin from wood chips, carbohydrates from solids, protein from proteinaceous materials and the like in any liquid solid contact system.

In extractors, a continuous, for example, chain of baskets are consecutively filled with a material, e.g., cotton-seed meal from which the oil is to be extracted. A solvent is mixed with the material and allowed to percolate through the material to dissolve or extract the oil. As the cycle nears completion, the baskets are inverted to dump the material, whereupon it may be further processed or otherwise disposed of.

The rate of percolation of the solvent or of the miscella (a solution of oil or fat in the solvent) is controlled by the preparation of the solids from which the oil is to be extracted. It is desirable that the percolation rate be controlled so that sufficient contact time between the solids and solvent is allowed for the efficient extraction of the oil or fat. However, the percolation rate must be rapid enough to allow substantially complete drainage of the solvent from the solids before the solids are dumped from the baskets into a receiving hopper and then passed on to driers or desolventizing equipment.

In spite of the best operating procedures, there are times when the preparation of the solids gets out of control. If the preparation is such that the bed of solids in the baskets becomes too compact, the solvent does not percolate freely and the baskets may carry an appreciable amount of liquid (solvent or miscella) above the bed of solids at the time the baskets are dumped. This condition is undesirable for several reasons:

(1) If drainage is very poor, the liquid above the solids will carry some oil or fat. If this liquid is dumped with the solids, the oil or fat carried by the liquid remains with the solids when solvent is removed and increases the loss of oil or fat.

(2) The excess liquid overloads the driers or desolventizing equipment and can cause lost time and expensive shutdowns.

(3) A serious hazard can result if this overloading allows solid material to discharge from the driers or desolventizers which is not completely free of solvent. Most solvents used in extracting oils or fats are highly flammable and the discharge of solids containing solvent has been known to cause serious explosions and fires.

(4) If the bed of solid material in the basket becomes so tight that the total liquid introduced will not percolate through the bed, then the liquid overflows at the top of the basket. With the usual basket, this overflowing liquid carries some solids with it and the solids fall to the bottom of the extractor with the miscella. These solids are picked up with the liquid by the miscella pumps and frequently stop up both the pumps and the lines.

It would be advantageous to provide an extractor basket and apparatus and a method of solvent extraction which overcomes these disadvantages.

It is therefore an object of the present invention to provide an improved extractor basket which will prevent liquid above the solids from being dumped with the solids.

Another object of the present invention is to provide an improved extractor basket which will divert overflowing liquid from the extraction bed to the next lower basket instead of to the extractor bottom.

Still another object of the present invention is to provide an improved extractor basket which drains liquids above the solid bed from the solids when the basket is tilted prior to dumping and channels this liquid so that it does not fall into the hopper with the solids.

A further object of the present invention is to provide an improved extraction apparatus with provision for draining excess liquid from the baskets.

Yet another object of the present invention is to provide an improved vertical extraction apparatus with provision for draining excess liquid from the baskets, and directing it into the next lower basket, and as the basket is tilted for dumping, directing remaining excess liquid into the next lower basket.

Another object of the present invention is to provide an improved method for the extraction of material with a liquid wherein excess liquid is drained from the extractor basket.

A still further object of the present invention is to provide an improved method for use in generally vertical extractors wherein excess liquid is drained from the basket and directed into the next lower basket, and as the baskets are tilted for unloading, any remaining excess liquid is drained and directed to the next lower basket.

Other and further objects, features and advantages will be apparent from the following description of a presently preferred embodiment of the invention, given for the purpose of disclosure, and taken in conjunction with the accompanying drawings, where like character references designate like parts throughout the several views, and where FIGURE 1 is a partial sectional view of an extractor apparatus according to the invention which can be used in the method of the invention, FIGURE 2 is a sectional side view of an extractor basket of the invention taken along the line 2—2 of FIGURE 3, and FIGURE 3 is a top view of the extractor basket of FIGURE 2, partially in section.

Referring now to the drawings, and particularly to FIGURE 1, the reference numeral 10 generally designates the extractor basket, a plurality of which are mounted on an endless belt mechanism, not shown, by which the baskets 10 revolve within an extraction chamber, also not shown. The extraction chamber at its lower end includes the usual solvent and miscella collection means, lines, pumps, and discharge means, also not shown, and, of course, the solvent extraction system includes apparatus and the like, all of which have been eliminated to simplify the disclosure, since any desired arrangement and means may be utilized. The baskets 10 are filled with the solids 12 by the conventional loading device 14.

As best seen in FIGURES 2 and 3, the baskets 10 each include the sides 13 which are of generally rounded configuration and converge inwardly at their upper and lower portions, the end portions 15, the substantially open top 17 for reception of the solids 12 and the generally perforate bottom 18, here shown as a screen disposed above the openings 19.

As best seen in FIGURE 2, the basket 10 includes a channel or liquid passageway 26 on one side 13 of the basket 10. The function of the channel 26 is not only to provide a passageway through which an excess of liquid may readily flow to the next lower basket, but also to provide a path for the flow of non-percolated liquid to the next lower basket when the basket is being tilted prior to dumping, as shown at 22 in FIGURE 1. Although the channel 26 is shown as a separate or false side to the basket 10, it is readily apparent that any suitable liquid passageway means may be utilized. The channel 26 is placed so that when the baskets 10 are in vertical alignment, the liquid flowing therethrough is deposited in the next lower basket. Further, the top edge 28 of the channel 26 is placed so that it is lower than the side 13 of the basket 10. Thus, as the basket 10 is tilted, as shown at 22 in FIGURE 1, any liquid above the bed will flow into the channel 26 and not over the side 13. This liquid will likewise be deposited in the next lower basket 10 and will not fall to the bottom of the extractor. If, however, the invention is used in an extractor of the horizontal type, such as is shown in U.S. Patent 2,663,624, the liquid will be deposited in the bottom of the extractor, but it will not fall into the hopper 20.

Referring again to FIGURE 1, the baskets 10 are tilted adjacent the hopper 20, about their axis 21, as at 22, and are inverted over the hopper 20, as at 24, so that the solids 12 are deposited in the hopper 20. Any conventional means may be utilized for this purpose, here shown schematically as the wheel 23, belt chain 31, track 27 and pin wheel 29. The solids 12 are removed from the hopper 20 by any suitable means, such as by the conveyor screw 25.

In use, and with reference to FIGURE 1, the extractor basket 10 is filled with liquid 16 and solids 12 in a conventional manner. The liquid 16 percolates downwardly through the bed of solids 12. If the solids are packed too tightly or improperly processed and the liquid does not percolate freely, any surplus liquid gathered in one basket will flow through the channel 26 into the next lower basket or finally to the bottom of the extractor chamber, not shown. This prevents large amounts of solids which otherwise would be carried with the overflowing liquid from falling to the bottom of the extractor and then clogging the various liquid or solvent lines, pumps, and the like.

As the basket 10 is tilted, as shown at 22, any remaining liquid 16 will flow through the channel 26 to the next lower basket. Thereupon the basket 10 is dumped, as shown at 24, into the hopper 20, and the dumped solids 12 carry along only a minimal amount of liquid 16 which the further treating equipment can easily handle. Thereupon, the basket 10 is returned to its original position so that it may repeat the cycle.

Thus it is seen that the present invention provides not only an improved extractor basket, but also an improved extractor apparatus. The function of the entire extractor is improved in that the hopper will not be deluged with excess liquid, for example, miscella, when extracting oil or fat from cottonseed meal, and the pumps and lines will not receive excessive bits of solids which heretofore have overflown the baskets.

The method of the invention has been described to an extent in connection with the apparatus of the invention. The method of the present invention, however, includes loading the baskets with solids and liquid, percolating the liquid through the solids, and draining excess liquid from the baskets to the next lower basket, if the baskets are revolved mainly in a vertical direction and a basket is below the basket being drained. Toward the end of the cycle of revolution of the baskets, the baskets are tilted to dump their solids, however, excess liquid or solvent is drained off the upper portion of the solids and not passed into the hopper or receptacle receiving the solids thus advantageously saving the liquid and any substances extracted from the solids and providing solids free of any excess liquid or solvent. When applying the method of the invention to so-called vertical extraction methods, the excess liquid or solvent advantageously is directed to the next succeeding basket so that maximum extraction by the liquid or solvent used is obtained.

As previously mentioned, the apparatus and method of the invention are particularly useful in solvent extraction of oil and fat from cottonseed meal, as well as other extraction in liquid solid contact systems.

The present invention, therefore, is well adapted to carry out the objects and attain the ends and advantages mentioned as well as others inherent therein. While a presently preferred embodiment of the invention is given for the purpose of disclosure, numerous changes in the details of construction and the combination, shape, size and arrangement of parts may be resorted to without departing from the spirit and scope of the invention as hereinafter claimed.

What is claimed is:

1. In a method for extraction from a material by a downwardly percolating solvent in a series of generally vertical extractor baskets wherein said baskets are loaded with material, solvent is percolated through said material, and said material is dumped into a receiving hopper by tilting said basket after extraction, the improvement including draining excess solvent from an upper basket away from the hopper and into a next lower basket as said upper basket is tilted for dumping, and then dumping the material in said upper basket into the hopper.

2. An extraction method which includes the steps of:
   moving a plurality of extractor baskets on a circuit some part of which is ascending,
   loading the baskets with a bed of material,
   injecting solvent on said bed of material,
   normally percolating the solvent downwardly through the material,
   draining the percolated solvent from the bottom of the bed of material,
   tilting the baskets consecutively above a receiving hopper,
   draining unpercolated solvent from an upper basket away from the hopper and into a next lower basket as the upper basket is tilted, and
   dumping the material in the tilted basket into the receiving hopper.

3. In an apparatus for solvent extraction from a bed of material wherein a solvent is percolated downwardly through the bed, the combination of a plurality of extractor baskets which move on a circuit some part of which is ascending, imperforate sides and a perforate bottom on each of said baskets through which the solvent normally drains; means for loading said baskets with material and for injecting solvent onto said material; means for cyclic movement of said baskets on said ascending circuit; means for tilting and inverting said baskets for unloading; and enclosed excess solvent channel means within each of said baskets extending and draining from the bottom thereof at a point over the next lower basket when on said ascending circuit to a point above the bed, said enclosed channel means adjacent that side of said basket which is first tilted for unloading, said channel means draining excess solvent above said bed from said basket into the next lower basket and when tilted said enclosed channel means draining any remaining excess solvent into the next lower basket.

References Cited in the file of this patent

UNITED STATES PATENTS

| | | |
|---|---|---|
| 1,668,557 | Grondal | May 8, 1928 |
| 2,641,536 | Upton | June 9, 1953 |
| 2,667,881 | Watkins et al. | Feb. 2, 1954 |
| 2,979,204 | Yeiser | Apr. 11, 1961 |

FOREIGN PATENTS

| | | |
|---|---|---|
| 634,152 | Germany | Mar. 5, 1935 |
| 507,465 | Great Britain | June 15, 1939 |
| 662,211 | Great Britain | Dec. 5, 1951 |